United States Patent
Guichard et al.

(10) Patent No.: US 9,258,243 B2
(45) Date of Patent: Feb. 9, 2016

(54) SYMMETRIC SERVICE CHAIN BINDING

(71) Applicant: Cisco Technology, Inc., San Jose, CA (US)

(72) Inventors: James Guichard, New Boston, NH (US); Paul Quinn, San Francisco, CA (US); Rex Fernando, Dublin, CA (US); Govind P. Sharma, Union City, CA (US); David Ward, Los Gatos, CA (US); Hendrikus G. P. Bosch, Aalsmeer (NL); Luyuan Fang, Holmdel, NJ (US)

(73) Assignee: Cisco Technology, Inc., San Jose, CA (US)

(*) Notice: Subject to any disclaimer, the term of this patent is extended or adjusted under 35 U.S.C. 154(b) by 209 days.

(21) Appl. No.: 13/891,247

(22) Filed: May 10, 2013

(65) Prior Publication Data

US 2014/0334295 A1 Nov. 13, 2014

(51) Int. Cl.
*H04L 12/721* (2013.01)
*H04L 12/859* (2013.01)
*H04L 12/851* (2013.01)

(52) U.S. Cl.
CPC ........ *H04L 47/2475* (2013.01); *H04L 47/2441* (2013.01)

(58) Field of Classification Search
USPC .......................................................... 370/230
See application file for complete search history.

(56) References Cited

U.S. PATENT DOCUMENTS

| | | | |
|---|---|---|---|
| 7,558,261 B2 | 7/2009 | Arregoces et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 8,311,045 B2 | 11/2012 | Quinn et al. | |
| 8,442,043 B2 | 5/2013 | Sharma et al. | |
| 2006/0092950 A1 | 5/2006 | Arregoces et al. | |
| 2006/0095960 A1 | 5/2006 | Arregoces et al. | |
| 2008/0177896 A1 | 7/2008 | Quinn et al. | |
| 2009/0037713 A1* | 2/2009 | Khalid et al. | 713/1 |
| 2010/0165985 A1 | 7/2010 | Sharma et al. | |
| 2014/0215560 A1* | 7/2014 | Roberson | 726/3 |
| 2014/0307744 A1* | 10/2014 | Dunbar et al. | 370/401 |

OTHER PUBLICATIONS

U.S. Appl. No. 61/811,635, filed on Apr. 12, 2013.*
Rosen, et al., " BGP/MPLS IP Virtual Private Networks (VPNs)," Network Working Group, RFC 4364, Feb. 2006, pp. 1-47.

* cited by examiner

*Primary Examiner* — Edan Orgad
*Assistant Examiner* — Sithu Ko
(74) *Attorney, Agent, or Firm* — Edell, Shapiro & Finnan, LLC

(57) ABSTRACT

A plurality of network nodes are deployed in a network, each network node configured to apply a service function to traffic that passes through the respective network nodes. A controller generates information for a service chain that involves application to traffic of one or more service functions at corresponding ones of the plurality of network nodes along a forward path through the one or more network nodes. The controller identifies one or more of the service functions within the service chain that is stateful. When one or more of the service functions of the service chain is stateful, the controller generates information for a reverse path through the one or more service nodes for the one or more stateful service functions. The controller binds a forward chain identifier for the forward path with a reverse chain identifier for the reverse path for the service chain.

20 Claims, 6 Drawing Sheets

SYMMETRIC SERVICE CHAIN BINDING

TECHNICAL FIELD

The present disclosure relates to networking for service chains.

BACKGROUND

Today's network services are becoming more and more complex. In many cases a service is constructed as a chain of independent service functions that follow an ordered sequence of execution. Such service chains are unidirectional in nature, i.e., traffic is forwarded through the chain in a single direction. The forwarding policy for a service chain is carried in the data plane using a service header. The service header is used to specify the service chain details (order of service functions that to be applied to packets, and optionally location/status of these service functions) as well as context information used in the application of the service.

While unidirectional service chains are useful, their current structure is unable to fully satisfy the requirements of stateful Internet Protocol (IP) services. Such services require that traffic be forwarded through the same set of service functions (at the exact same location) in both directions: client-to-server and server-to-client.

DESCRIPTION OF EXAMPLE EMBODIMENTS

Overview

Presented herein are techniques to enable automated association and binding of forward/reverse service chains and the bi-directional traffic flows of stateful services, e.g., stateful Internet Protocol (IP) services. A plurality of network nodes are deployed in a network, each network node configured to apply a service function to traffic that passes through it. A controller generates information for a service chain that involves application to traffic of one or more service functions at corresponding ones of the plurality of network nodes along a forward path through the one or more network nodes. The controller identifies one or more of the service functions within the service chain that is stateful. When one or more of the service functions of the service chain is stateful, the controller generates information for a reverse path through the one or more network nodes for the one or more stateful service functions. The controller binds a forward chain identifier for the forward path with a reverse chain identifier for the reverse path for the service chain.

Example Embodiments

A service chain consists of an entry point node (also called a head-end node) and an ordered list of service functions and their physical network location, represented as [service-function, service-location] tuples, which are to be executed on packets that are forwarded through the chain of service locations, also called network nodes or service nodes. Individual service functions referenced by the service chain may be deployed at multiple points in a network topology dependent upon redundancy and horizontal service scaling requirements. The association between a service chain and the physical location of each individual service function is referenced using a globally unique service-chain-id. A network node (or service node) is a network device, such as a router, switch, gateway etc., that has a server blade or other computing device coupled to it, which server blade or computing device is configured with applicable software capability to execute one or more services on network traffic that is directed to that network node. The network nodes may be physical or virtual network elements.

Packet forwarding through a service chain is unidirectional. The head-end node acts as a packet classifier interface into the service chain (determining which traffic flows require redirection into the service chain and which do not) imposing the necessary service header (containing the service-chain-id) and the transport encapsulation to force the traffic flow to the first service function at the appropriate network location as specified in the service chain structure. For example, service-chain-id$^x$ may be specified as:

Service-chain-id$^x$=[head-end-node$^1$], [service-function$^1$, service-location$^1$], [service-function$^2$, service-location$^2$]

Figure 1:
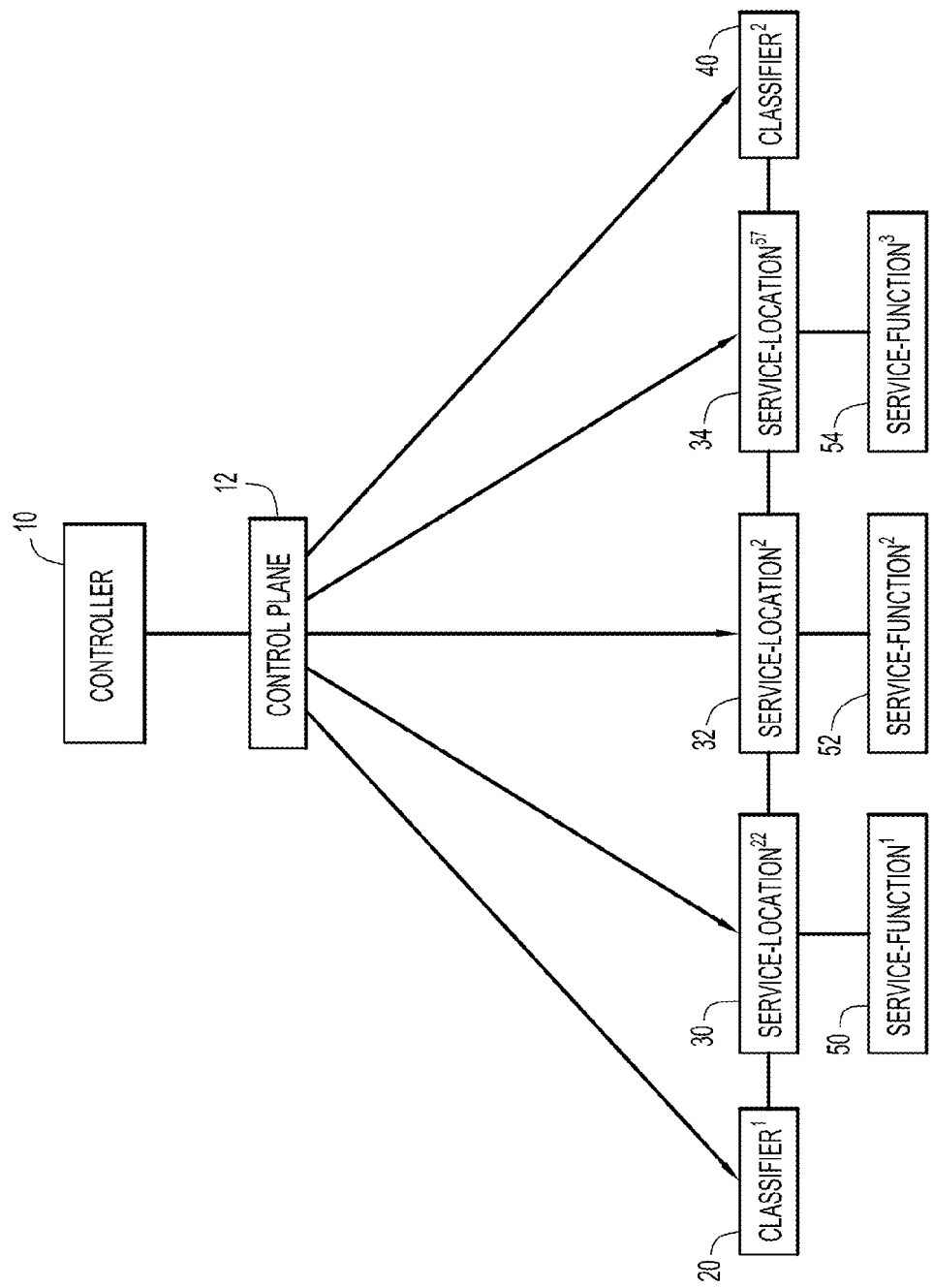
FIG. 1 is a diagram illustrating an example of a service chain in which at least one service function is stateful.

Stateful IP services (firewall, network address translation (NAT), Deep Packet Inspection (DPI), intrusion detection services (IDS), etc.) require that flow state information be maintained and forward/reverse traffic flows be forwarded through the same service functions at the same locations. FIG. 1 illustrates an example of a service chain for a service that is constructed using a unidirectional service chain. In FIG. 1, there is a Software Defined Networking (SDN) controller 10 that communicates with a plurality of network/service nodes via a control plane shown at reference numeral 12. The network/service nodes are also called service locations. The service nodes include a head-end node$^1$ 20, also called classifier$^1$, service-location$^{22}$ shown at reference numeral 30, service-location$^2$ shown at reference numeral 32 and service-location$^{57}$ shown at reference numeral 34, followed finally by classifier$^2$ shown at reference numeral 40. The service function at service-location$^{22}$ is service-function$^1$ shown at reference numeral 50, the service function at service-location$^2$ is service-function$^2$ shown at reference numeral 52 and the service function at service-location$^{57}$ is service-function$^3$ shown at reference numeral 54.

The unidirectional service chain for this example service is specified as follows.
Service$^x$=[head-end-node$^1$], [service-function$^1$, service-location$^{22}$], [service-function$^2$, service-location$^2$], [service-function$^3$, service-location$^{57}$], where service-function$^3$ is an IP stateful service function.

The structure of the service chain forces traffic that is classified at [head-end-node$^1$] 20 as belonging to Service$^x$ to be forwarded into the service chain before being sent off net. As service-function$^3$ is an IP stateful service function it is necessary that return traffic be passed back through service-function³ located at service-location⁵⁷ because this location holds all the necessary service state information. This reverse path forwarding requirement cannot be facilitated with current state-of-the-art techniques as they do not allow for an automated association of the forward/reverse traffic flows of a given service chain. Therefore, the operator must manually configure the system to explicitly identify the forward/reverse service chains and ensure that the appropriate service-chain-id's are correctly mapped to the relevant network nodes.

Presented herein are techniques for automation of the forward/reverse traffic flows on a per service chain basis. For each unidirectional service chain, an identification/determination is made as to whether one or more of the service functions within the chain is stateful. If a positive identification of a stateful service function is made, then an additional service-chain-id is created to represent the reverse path of the service chain, and the reverse path of the service chain is bound to the unidirectional service chain used in the forward direction. The automated binding may be based on a range of attributes (e.g. class name, flow details, SDN controller knowledge, etc.). The resultant binding creates a forward-chain-id and a reverse-chain-id association for the service chain:

$Service^x$=service chain association {forward-chain-id$^x$, reverse-chain-id$^x$} where: forward-chain-id$^x$=[service-function¹, service-location²²], [service-function², service-location²], [service-function³, service-location⁵⁷]; and
Reverse-chain-id$^x$=[service-function³, service-location⁵⁷]

Thus, the binding consists of generating data representing the association of the forward-chain-id and the reverse-chain-id for a service chain. Using this association, the service chain infrastructure as well as the service function software can correlate traffic flows in both directions, with each service hop involved in the forwarding of packets for a given service chain holding the association and programmed by a central service orchestration platform. The correct service-chain-id pairs are presented for symmetric encapsulation as well as bound together at each network node involved in the service chain. In addition, the association of symmetric service-chain-id's enables network nodes that proxy/terminate sessions between clients and servers to send responses of the proxied sessions arriving on the forward-chain-id, as an example, to the reverse-chain-id to reach the session originator.

At an orchestration layer in a cloud management platform, a service is defined, (for example secure web hosting), that when decomposed, defines (in addition to many other elements) specific L4-L7 service functions, service metrics and associated selection/attachment criteria (i.e. tenant, class of traffic, flow, etc.). These services and associated metrics are sent to the controller 10 for service selection, graph creation and rendering.

Active service functions are registered with the controller 10. Registration may involve the controller 10 receiving notifications of all active service functions among the plurality of network nodes, each notification including information describing service function capabilities. Post-service function registration, the controller 10 has a view of all available service functions within the service domain and their locations, e.g. network location, Internet Protocol/Media Access Control (IP/MAC) addresses, as well as, if needed, topological placement e.g. [data center1, rack1]. Additionally, network nodes publish their service function capabilities, e.g. [service-function¹ is an application firewall, symmetry is required and can process 500 sessions], [service-function² is an IP firewall, symmetry is required and can handle 200,000 sessions] and so on. The controller 10 maintains a catalog of services, and the associated service functions that comprise them (a service may consist of a single or multiple service functions), that can be instantiated as needed, with similar attributes. This catalog of services comprises data describing attributes of all active service functions, and from this data the controller 10 generates information for a service chain by selecting necessary service functions and their associated network nodes for the service chain from the stored data. The controller 10 also identifies which one or more service functions in the service chain are stateful. For example, the controller may store information indicating that it has an image for a server load balancer, that this type of load balancer requires y amount of central processor units (CPU) and memory to run, and is capable of Secure Socket Layer (SSL) offload at the rate of n packets per second.

During service chain creation, the controller 10 selects all the necessary service functions and their locations and a service path graph is created. During path definition, symmetry requirements are defined as well. At this point, the service infrastructure has, in addition to a view of available service functions, a series of service paths, both forward and reverse (if required) coupled and the associated classification criteria (tenant, flow, etc.).

The controller 10 generates a service header that represents the summarized view of this service chain. The previous $Service^x$ example may be represented as follows:
$Service^x$=service chain association {forward-chain-id$^x$, reverse-chain-id$^x$} where:
forward-chain-id$^x$=[service-function¹, service-location²²], [service-function², service-location²], [service-function³, service-location⁵⁷]; and
Reverse-chain-id$^x$=[service-function³, service-location⁵⁷]
The controller 10 generates the service header and generates classification criteria of the service chain, and as explained further hereinafter, sends the service header and the classification criteria for the service chain to the one or more network nodes.

Figure 2:
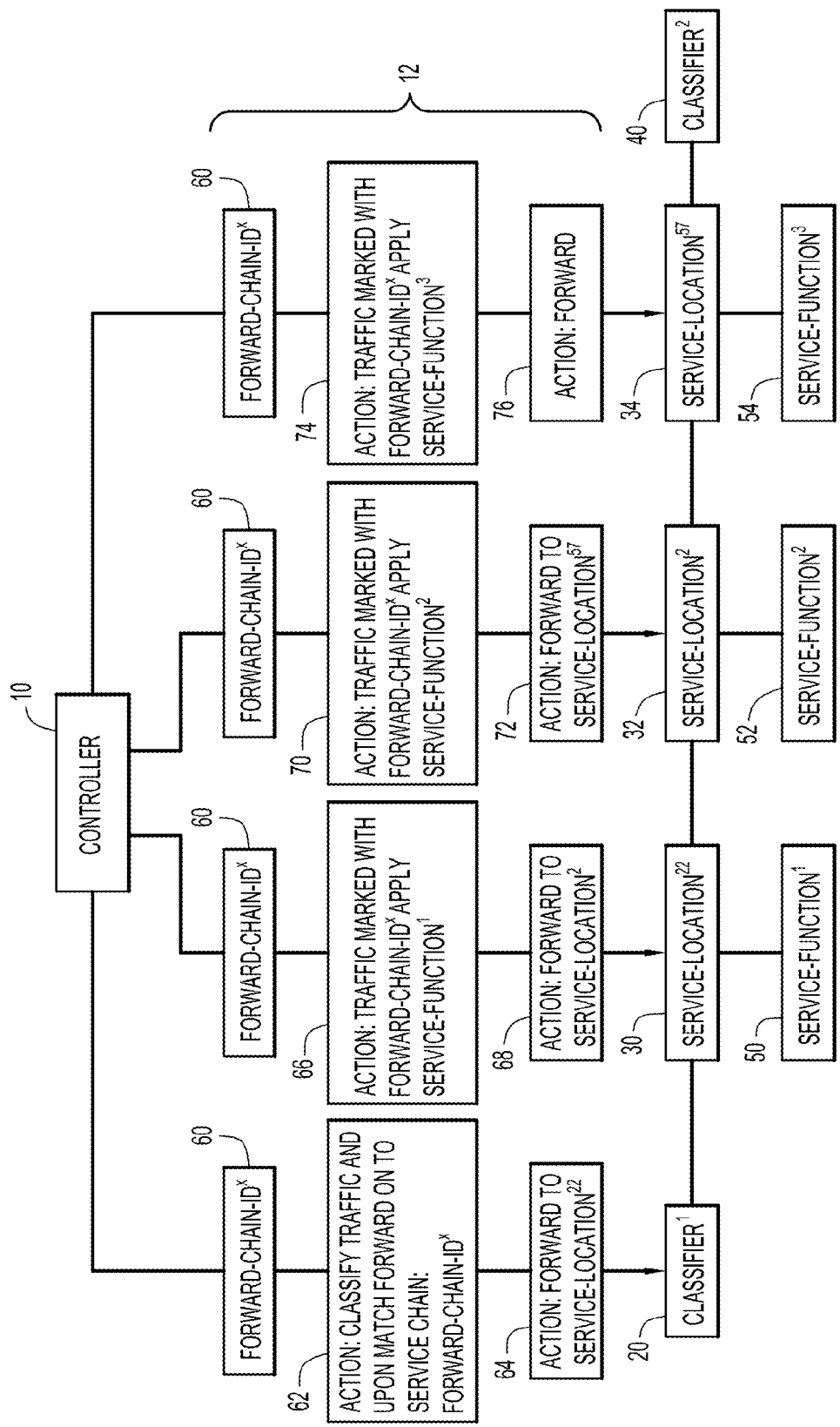
FIG. 2 is a diagram illustrating an example of control plane information being pushed to service locations for a forward chain path of the service chain shown in FIG. 1.

Reference is now made to FIG. 2. The controller 10 pushes the state of forward-chain-id$^x$ 60 to all necessary network nodes via the control plane 12. Specifically, the controller 10 pushes to classifier¹ 20 forward-chain-id$^x$ 60 along with Action 62: Classify traffic and upon match forward on to service chain: forward-chain-id$^x$ and Action 64: Forward to service-location²². To service-location²² the controller 10 pushes forward-chain-id$^x$ 60 along with Action 66: Traffic marked with forward-chain-id$^x$ apply service-function¹ and Action 68: Forward to service-location². Similarly, the controller 10 pushes to service-location² forward-chain-id$^x$ 60 along with Action 70: Traffic marked with forward-chain-id$^x$ apply service-function² and Action 72: Action: Forward to service-location⁵⁷. Again, the controller 10 pushes to service-location⁵⁷ forward-chain-id$^x$ 60 along with Action 74: Traffic marked with forward-chain-id$^x$ apply service-function³ and Action 76: Forward.

Figure 3:
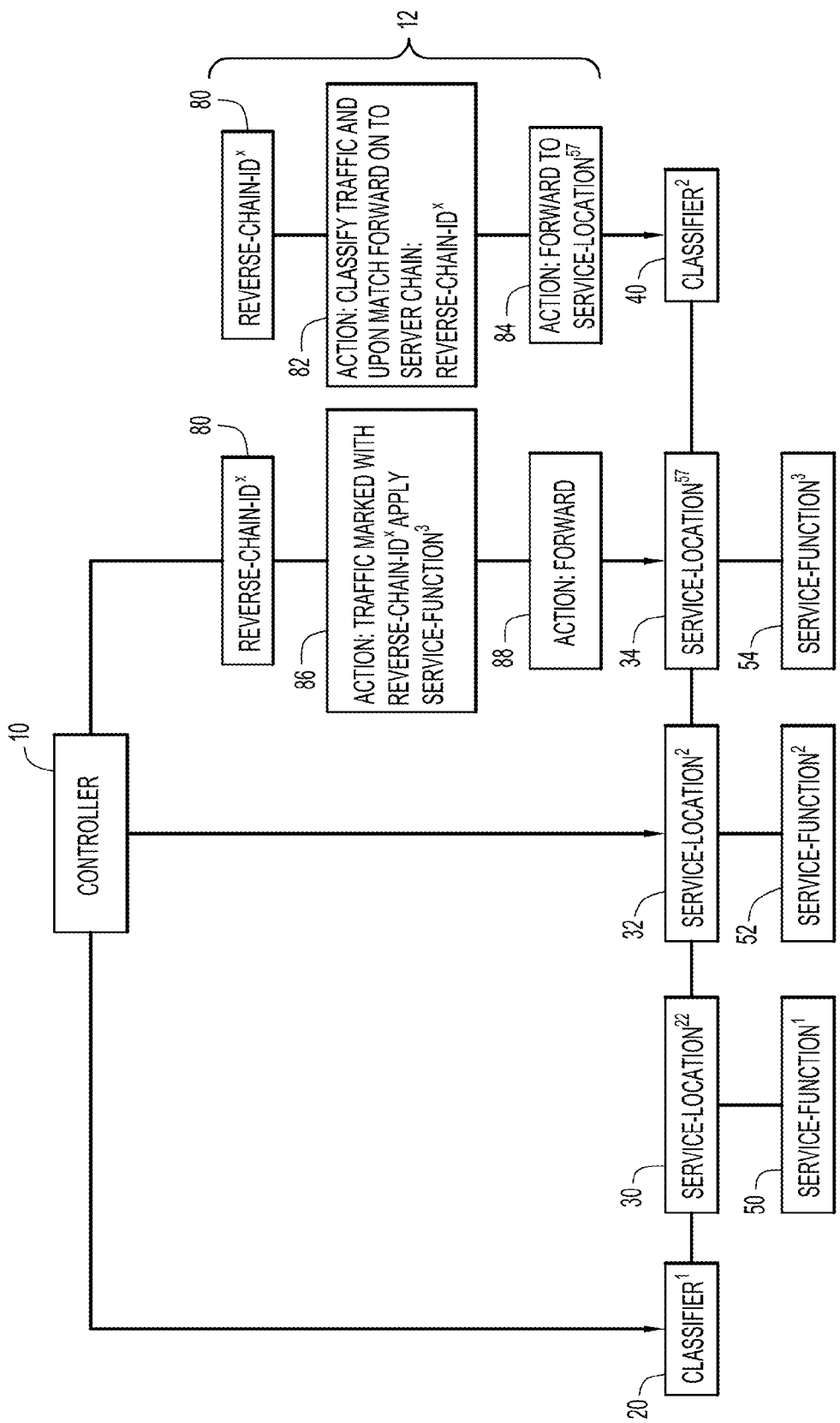
FIG. 3 is a diagram illustrating an example of control plane information being pushed to service locations for a reverse chain path of the service chain shown in FIG. 1.

FIG. 3 shows the state the controller 10 pushes for the reverse chain. Specifically, the controller 10 pushes to clasifer² reverse-chain-id 80 along with Action 82: Classify traffic and upon match forward on to service chain: reverse-chain-id$^x$ and Action 84: Forward to service-location⁵⁷. Similarly, the controller 10 pushes to service-location⁵⁷ reverse-chain-id$^x$ 80 along with Action 86: Traffic marked with reverse-chain-id$^x$ apply service-function³ and Action 88: Forward.

Traffic in the forward direction is classified by the head-end node (classifier¹) and directed into service chain forward-chain-id$^x$. Reverse traffic may appear at any peering router and therefore a network orchestration platform applies classification rules that are able to intercept the reverse traffic and then classify it as requiring treatment through service chain reverse-chain-id$^x$. In prior systems, the two service chains and headers are viewed as separate distinct elements, whereas in the techniques presented herein, both the forward and reverse chains are formed at the same time with knowledge and binding of the relationship between them.

The service headers allocated for the service chain are pushed to the forwarding and service infrastructure. Head-end nodes impose these headers based on policy (e.g. tenant[1] traffic is coming from virtual routing forwarding (VRF) function x) and then forwards matching traffic into the service chain. Each network node within the service chain uses the header information to impose policy and forward packets to the next hop. The reverse path, already programmed in all elements, follows the same logic.

Figure 4:
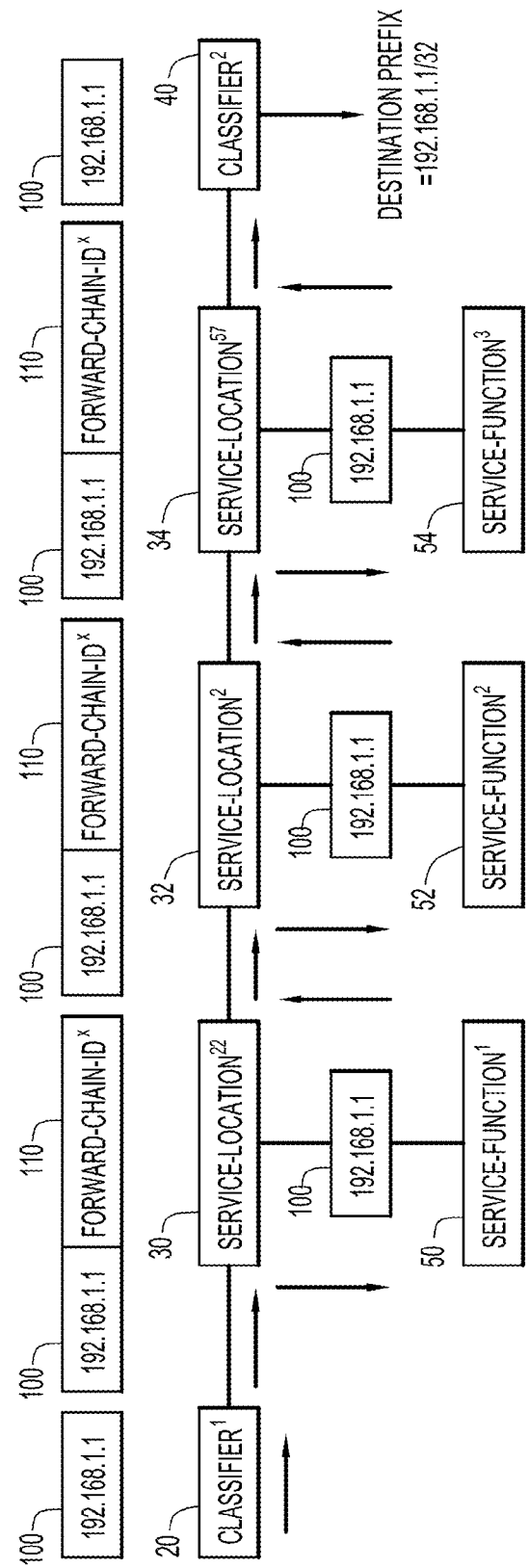
FIG. 4 is a diagram illustrating an example of a service header applied to network traffic that matches flow parameters for a particular service.

Reference is now made to FIG. 4. FIG. 4 shows a packet 100 (from a client envisioned on the right side of the diagram) for traffic destined for a network host (server) with the IP address 192.168.1.1/32 (envisioned on the right side of the diagram). The head-end node 20 imposes the service header 110 to packet 100 if the packet satisfies criteria for the corresponding service (Service), where service header includes the service chain identifier forward-chain-id$^x$, and forwards the packet 100 into the service chain, to service-location$^{22}$. Service-location$^{22}$ determines that packet 100 should be directed to service-function$^1$, and then forwards it on in the chain to service-location$^2$. Service-location$^2$ determines that packet 100 should be directed to service-function$^2$, and then forwards it on in the chain to service-location$^{57}$. Service-location$^{57}$ determines that packet 100 should be directed to service-function$^3$, and then forwards it on to the other head-end node, classifier$^2$. Classifier$^2$ forwards the packet on to destination 192.168.1.1/32.

Service-chain-id's may be generated when a traffic flow is configured at a centralized controller, or this generation may be tied to more network-centric functions such as Authentication, Authorization and Accounting (AAA), Network Based Application Recognition (NBAR), and Deep Packet Inspection (DPI).

Figure 5:
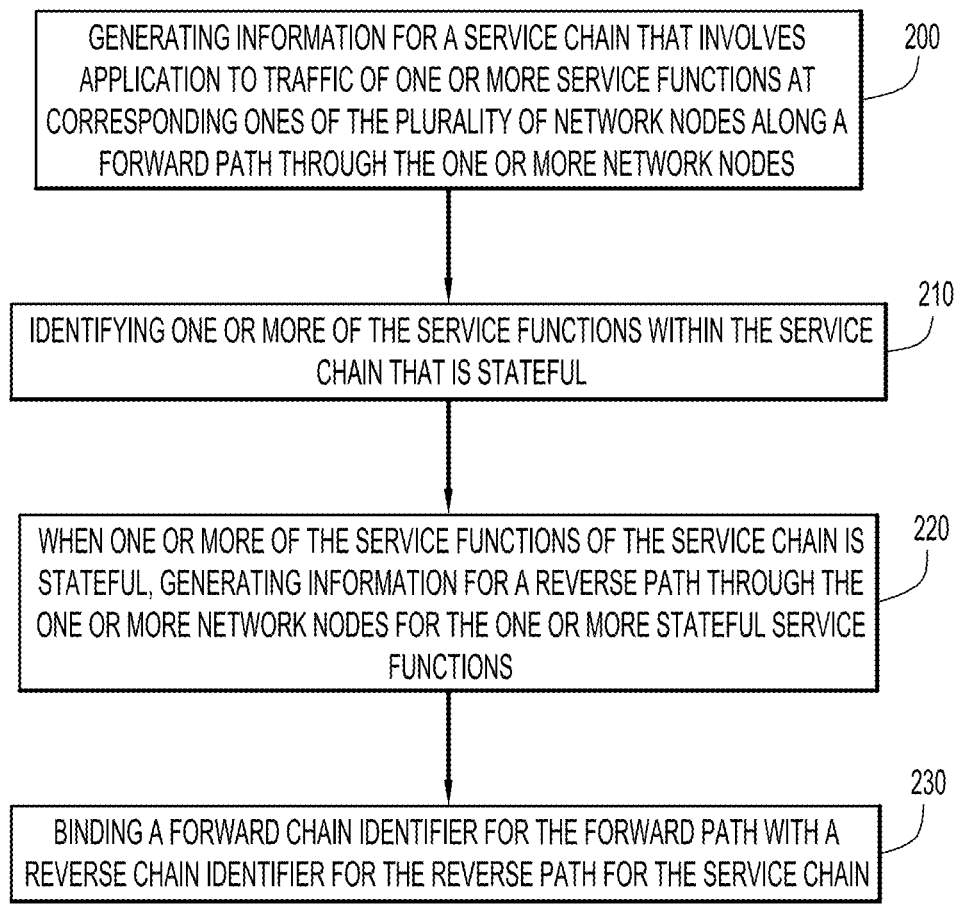
FIG. 5 is a flow chart depicting operations performed in a controller to bind a forward chain identifier and a reverse chain identifier for a service when at least one of the service functions of the service is stateful.

Turning now to FIG. 5, a flow chart is shown that depicts operations performed, e.g., in a controller, to create and distribute control plane information for a service chain associated with a service. These operations are performed in connection with a network comprising a plurality of network nodes, each configured to apply a service function to traffic that passes through it. At 200, information is generated for a service chain that involves application to traffic of one or more service functions at corresponding ones of the plurality of network nodes along a forward path through the one or more network nodes. At 210, an identification/determination is made of one or more of the service functions within the service chain that is/are stateful. At 220, when one or more of the service functions of the service chain is/are stateful, information is generated for a reverse path through the one or more network nodes for the one or more stateful service functions. At 230, a forward chain identifier for the forward path is automatically bound with a reverse chain identifier for the reverse path for the service chain. In binding the forward chain identifier with the reverse chain identifier (when one or more service functions are stateful), a service chain association is generated for the service chain. The service chain association comprises the forward chain identifier and the reverse chain identifier, wherein the forward chain identifier specifies an identifier of the network node and service function to be performed for each of the one or more service functions and classification criteria for traffic of the service chain, and the reverse chain identifier specifies an identifier of the network node and service function for each stateful service function and classification criteria for traffic of the service chain.

Furthermore, as described above in connection with FIGS. 2 and 3, after the binding operation at 230, the controller sends information of the forward chain identifier to the one or more network nodes in the forward path and sends information of the reverse chain identifier to the one or more network nodes in the reverse path. More specifically, the controller sends the service header and the classification criteria for the service chain to a head-end node in order to configure the head-end node to classify traffic in accordance with the classification criteria contained in the forward chain identifier so as to direct traffic matching the classification criteria into the forward path of the service chain and to cause any network nodes at which traffic for the reverse path appears to intercept that traffic for the reverse path and direct it to the one or more service nodes of the reverse path in correct order. The service header causes each network node within the service chain to impose policy for an associated service function and to forward traffic, after application of the associated service function, to the next hop in the service chain.

In summary, when packets traverse a list of services, called a service chain, symmetry is required to ensure that stateful services (e.g., stateful IP services) are processed in both the forward and reverse traffic flow directions, and in the correct order. Using the techniques presented herein, service headers used for service chaining are automatically created and allocated to support the required traffic flow symmetry.

These techniques facilitate orchestration and automated correlation and association of traffic flows in both forward and reverse directions. There are several advantages associated with these techniques.

Network provisioning. This is simplified since there is no need to associate unrelated headers at the edge of the network. Service chains are pseudo bi-directional.

Service provisioning. One of the challenges with the existing model for services is service policy attachment. Without the techniques presented herein, two unrelated headers need to be correlated on the network nodes for policy application. Using these techniques, given that both headers are allocated a priori and their symmetric relationship is known, they are conveyed to the network nodes simultaneously and bound to the appropriate policy.

Management. System management/orchestration no longer needs to correlate between independent service headers to determine service topology. Using these techniques, the symmetric headers are paired and the association is clear and conveyed to upper layer systems, greatly simplifying automated provisioning.

Troubleshooting. As with management, troubleshooting tools (or people) no longer need to correlate service headers to understand service path flows. Rather, the two symmetric headers are clearly coupled and communicated to the diagnostic tools.

The symmetric headers allow for consistent header allocation, and consistent policy application per service, in both directions without external correlation. This ensures that the correct service policy is applied. This also allows proxied services to send messages/responses to the correct chain of service functions in both directions (forward and reverse).

Figure 6:
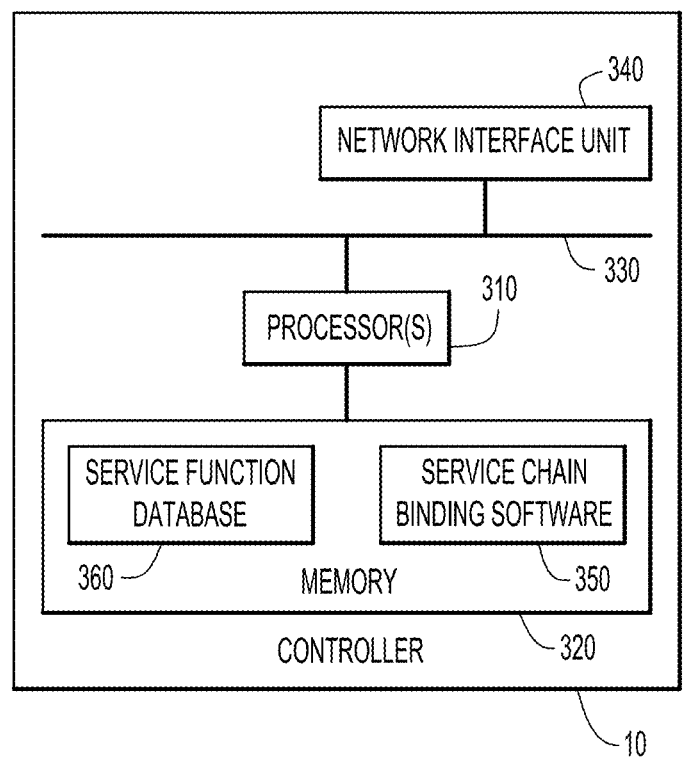
FIG. 6 is an example of a block diagram of the controller configured to generate and forward control information according to the techniques presented herein.

Turning now to FIG. 6, an example block diagram is shown for a controller configured to perform the operations described herein for controller 10. It should be understood that a virtual controller would be a software-emulated or virtualized version of what is shown in FIG. 6, such as software running in a data center. The controller 10 includes one or more processors 310, memory 320, a bus 330 and a network interface unit 340. The processor 310 may be a microprocessor or microcontroller. The network interface unit 340 facilitates network communications between the controller 10 and the network nodes. The processor 310 executes instructions associated with software stored in memory 320. Specifically, the processor 310 stores service chain binding software 350 that, when executed by the processor 310, causes the processor 310 to perform the operations described herein with respect to FIGS. 1-5. The memory 320 also stores a service function database 360 that contains data about the service functions active on each of the network nodes, and attributes about those service functions.

The memory 320 may comprise read only memory (ROM), random access memory (RAM), magnetic disk storage media devices, optical storage media devices, flash memory devices, electrical, optical, or other physical/tangible memory storage devices. In general, the memory 320 may comprise one or more tangible (non-transitory) computer readable storage media (e.g., a memory device) encoded with software comprising computer executable instructions and when the software is executed (by the processor 310) it is operable to perform the operations described herein.

Thus, the techniques presented herein may be embodied in a method, an apparatus and computer readable storage media, for example. In method form, the method involves, in a network comprising a plurality of network nodes each configured to apply a service function to traffic that passes through the respective network nodes, a controller generating information for a service chain that involves application to traffic of one or more service functions at corresponding ones of the plurality of network nodes along a forward path through the one or more network nodes; identifying one or more of the service functions within the service chain that is stateful; when one or more of the service functions of the service chain is stateful, generating information for a reverse path through the one or more network nodes for the one or more stateful service functions; and binding a forward chain identifier for the forward path with a reverse chain identifier for the reverse path for the service chain.

In apparatus form, an apparatus is provided comprising a network interface unit configured to enable communications over a network, the network comprising a plurality of network nodes each configured to apply a service function to traffic that passes through the respective network nodes; memory; and a processor coupled to the network interface unit and the memory, wherein the processor is configured to: generate information for a service chain that involves application to traffic of one or more service functions at corresponding ones of the plurality of network nodes along a forward path through the one or more network nodes; identify one or more of the service functions within the service chain that is stateful; when one or more of the service functions of the service chain is stateful, generate information for a reverse path through the one or more network nodes for the one or more stateful service functions; and generate information to bind a forward chain identifier for the forward path with a reverse chain identifier for the reverse path for the service chain.

In computer readable storage media form, one or more computer readable storage media are provided encoded with software comprising computer executable instructions and when the software is executed operable to: generate information for a service chain that involves application to traffic of one or more service functions at corresponding ones of a plurality of network nodes along a forward path through the one or more network nodes, each of the plurality of network nodes configured to apply a service function to traffic that passes through it; identify one or more of the service functions within the service chain that is stateful; when one or more of the service functions of the service chain is stateful, generate information for a reverse path through the one or more network nodes for the one or more stateful service functions; and bind a forward chain identifier for the forward path with a reverse chain identifier for the reverse path for the service chain.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   in a network comprising a plurality of network nodes each configured to apply a service function to traffic that passes through the respective network nodes, a controller generating information for a first service chain that involves application to traffic of one or more service functions at corresponding ones of the plurality of network nodes along a forward path through the one or more network nodes, wherein the generated information for the first service chain including a forward chain identifier that identifies all service functions and their respective locations along the forward path;
   identifying one or more of the service functions within the first service chain that are stateful and require flow state information be maintained such that forward traffic flows and reverse traffic flows be forwarded through same functions at same locations;
   when one or more of the service functions of the first service chain are stateful and require flow state information be maintained such that forward traffic flows and reverse traffic flows be forwarded through same functions at same locations, generating information for a second service chain through the one or more network nodes for the one or more stateful service functions in a reverse path, wherein the generated information for the second service chain including a reverse chain identifier that identifies all service functions and their respective locations along the reverse path; and
   binding the forward chain identifier for the first service chain with the reverse chain identifier for the second service chain.

2. The method of claim 1, further comprising generating a service chain association for the first service chain and the second service chain, the service chain association comprising the forward chain identifier and the reverse chain identifier, wherein the forward chain identifier specifies an identifier of the network node and service function to be performed for each of the one or more service functions and classification criteria for traffic of the first service chain, and the reverse chain identifier specifies an identifier of the network node and service function for each stateful service function and classification criteria for traffic of the second service chain.

3. The method of claim 2, further comprising sending the forward chain identifier to the one or more network nodes in the forward path and sending the reverse chain identifier to the one or more network nodes in the reverse path.

4. The method of claim 3, further comprising generating a service header that represents a summarized view of the first service chain and the second service chain and generating the classification criteria of the first service chain and the second service chain, wherein sending comprises sending the service header and the classification criteria for the first service chain and the second service chain to the one or more network nodes.

5. The method of claim 4, wherein sending further comprises sending the service header and the classification criteria for the first service chain and the second service chain to a head-end node in order to configure the head-end node to classify traffic in accordance with the classification criteria contained in the forward chain identifier so as to direct traffic matching the classification criteria into the forward path of the first service chain and to cause any network nodes at which traffic for the reverse path appears to intercept that traffic for the reverse path and direct it to the one or more service nodes of the reverse path of the second service chain in correct order.

6. The method of claim 5, wherein sending comprises sending the service header for the first service chain and the second service chain so as to cause each network node within the first service chain and the second service chain to impose policy for an associated service function and to forward traffic, after application of the associated service function, to the next hop in the first service chain and the second service chain.

7. The method of claim 1, further comprising receiving notifications of all active service functions among the plurality of network nodes, each notification including information describing service function capabilities.

8. The method of claim 7, further comprising storing data describing attributes of all active service functions, wherein generating information for the first service chain comprises selecting necessary service functions and their associated network nodes for the first service chain from the stored data, and wherein identifying is based on the stored data.

9. An apparatus comprising:
a network interface unit configured to enable communications over a network, the network comprising a plurality of network nodes each configured to apply a service function to traffic that passes through the respective network nodes;
memory; and
a processor coupled to the network interface unit and the memory, wherein the processor is configured to:
generate information for a first service chain that involves application to traffic of one or more service functions at corresponding ones of the plurality of network nodes along a forward path through the one or more network nodes, wherein the generated information for the first service chain including a forward chain identifier that identifies all service functions and their respective locations along the forward path;
identify one or more of the service functions within the first service chain that are stateful and require flow state information be maintained such that forward traffic flows and reverse traffic flows be forwarded through same functions at same locations;
when one or more of the service functions of the first service chain are stateful and require flow state information be maintained such that forward traffic flows and reverse traffic flows be forwarded through same functions at same locations, generate information for a second service chain through the one or more network nodes for the one or more stateful service functions in a reverse path, wherein the generated information for the second service chain including a reverse chain identifier that identifies all service functions and their respective locations along the reverse path; and
generate information to bind the forward chain identifier for the first service chain with the reverse chain identifier for the second service chain.

10. The apparatus of claim 9, wherein the processor is further configured to generate a service chain association for the first service chain and the second service chain, the service chain association comprising the forward chain identifier and the reverse chain identifier, wherein the forward chain identifier specifies an identifier of the network node and service function to be performed for each of the one or more service functions and classification criteria for traffic of the first service chain, and the reverse chain identifier specifies an identifier of the network node and service function for each stateful service function and classification criteria for traffic of the second service chain.

11. The apparatus of claim 10, wherein the processor is configured to send, via the network interface unit, the forward chain identifier to the one or more network nodes in the forward path and to send the reverse chain identifier to the one or more network nodes in the reverse path.

12. The apparatus of claim 11, wherein the processor is further configured to generate a service header that represents a summarized view of the first service chain and the second service chain and to generate the classification criteria of the first service chain and the second service chain, and to send, via the network interface unit, the service header and the classification criteria for the first service chain and the second service chain to the one or more network nodes.

13. The apparatus of claim 12, wherein the processor is configured to send, via the network interface unit, the service header and the classification criteria for the first service chain and the second service chain to a head-end node in order to configure the head-end node to classify traffic in accordance with the classification criteria contained in the forward chain identifier so as to direct traffic matching the classification criteria into the forward path of the first service chain and to cause any network nodes at which traffic for the reverse path appears to intercept that traffic for the reverse path and direct it to the one or more service nodes of the reverse path of the second service chain in correct order.

14. The apparatus of claim 13, wherein the processor is configured to send the service header for the first service chain and the second service chain so as to cause each network node within the first service chain and the second service chain to impose policy for an associated service function and to forward traffic, after application of the associated service function, to the next hop in the first service chain and the second service chain.

15. The apparatus of claim 10, wherein the processor is configured to receive notifications of all active service functions among the plurality of network nodes, each notification including information describing service function capabilities, and to store in the memory data describing attributes of all active service functions, in order to generate information for the first service chain by selecting necessary service functions and their associated network nodes for the first service chain from the stored data, and to identify stateful service functions based on the stored data.

16. One or more non-transitory computer readable storage media encoded with software comprising computer executable instructions and when the software is executed operable to:

generate information for a first service chain that involves application to traffic of one or more service functions at corresponding ones of a plurality of network nodes along a forward path through the one or more network nodes, each of the plurality of network nodes configured to apply a service function to traffic that passes through it, wherein the generated information for the first service chain including a forward chain identifier that identifies all service functions and their respective locations along the forward path;

identify one or more of the service functions within the service chain that are stateful and require flow state information be maintained such that forward traffic flows and reverse traffic flows be forwarded through same functions at same locations;

when one or more of the service functions of the service chain are stateful and require flow state information be maintained such that forward traffic flows and reverse traffic flows be forwarded through same functions at same locations, generate information for a second service chain through the one or more network nodes for the one or more stateful service functions in a reverse path, wherein the generated information for the second service chain including a reverse chain identifier that identifies all service functions and their respective locations along the reverse path; and bind the forward chain identifier for the first service chain with the reverse chain identifier for the second service chain.

17. The non-transitory computer readable storage media of claim 16, wherein the instructions operable to generate comprise instructions operable to generate a service chain association for the first service chain and the second service chain, the service chain association comprising the forward chain identifier and the reverse chain identifier, wherein the forward chain identifier specifies an identifier of the network node and service function to be performed for each of the one or more service functions and classification criteria for traffic of the first service chain, and the reverse chain identifier specifies an identifier of the network node and service function for each stateful service function and classification criteria for traffic of the second service chain.

18. The non-transitory computer readable storage media of claim 17, further comprising instructions operable to send the forward chain identifier to the one or more network nodes in the forward path and to send the reverse chain identifier to the one or more network nodes in the reverse path.

19. The non-transitory computer readable storage media of claim 18, further comprising instructions operable to generate a service header that represents a summarized view of the first service chain and the second service chain and to generate the classification criteria of the first service chain and the second service chain, and to send the service header and the classification criteria for the first service chain and the second service chain to the one or more network nodes.

20. The non-transitory computer readable storage media of claim 19, further comprising instructions operable to send the service header for the first service chain and the second service chain so as to cause each network node within the first service chain and the second service chain to impose policy for an associated service function and to forward traffic, after application of the associated service function, to the next hop in the first service chain and the second service chain.

* * * * *